United States Patent [19]

Ackeret

[11] Patent Number: 4,655,344
[45] Date of Patent: Apr. 7, 1987

[54] APPARATUS FOR STORING RECORDING MEDIA

[75] Inventor: Peter Ackeret, Kusnacht, Switzerland

[73] Assignee: IDN Inventions and Development of Novelties AG, Chur, Switzerland

[21] Appl. No.: 739,389

[22] Filed: May 30, 1985

[30] Foreign Application Priority Data

Jun. 1, 1984 [DE] Fed. Rep. of Germany ... 8416751[U]

[51] Int. Cl.$^4$ .................. B65D 85/57; B65D 85/672
[52] U.S. Cl. .................. 206/307; 206/309; 206/387; 206/444; 312/12; 312/333
[58] Field of Search ............... 206/309, 387, 425, 444, 206/307; 312/8–19, 319, 333

[56] References Cited

U.S. PATENT DOCUMENTS

| 1,706,085 | 3/1929 | Straubel | 312/333 |
| 3,239,298 | 3/1966 | McCarthy | 312/333 |
| 3,677,396 | 7/1972 | Starr | 206/387 |
| 3,899,229 | 8/1975 | Ackeret | 206/387 |
| 4,046,255 | 9/1977 | Ackeret | 206/387 |
| 4,216,857 | 8/1980 | Huang | 206/387 |
| 4,243,279 | 1/1981 | Ackeret | 312/12 |
| 4,399,913 | 8/1983 | Gelardi et al. | 312/12 |

FOREIGN PATENT DOCUMENTS

| 0492547 | 4/1977 | Australia | 206/387 |
| 0029619 | 3/1958 | Finland | 312/333 |
| 1173273 | 12/1969 | United Kingdom | 312/333 |
| 2099793 | 12/1982 | United Kingdom | 206/387 |

Primary Examiner—William Price
Assistant Examiner—Jimmy G. Foster
Attorney, Agent, or Firm—Chilton, Alix & Van Kirk

[57] ABSTRACT

Easily operable apparatus for storing and retrieving recording media, magnetic tape cassettes and compact discs for example, is characterized by a housing and at least first recording media carrier slidably supported therein for movement between a stored position and a recording medium removal position under the influence of an ejection spring. The storage apparatus is provided with a locking mechanism, for retaining the carrier in the stored position, which will not be unintentionally released in response to rapid acceleration or deceleration when the storage apparatus is mounted within a motor vehicle.

37 Claims, 26 Drawing Figures

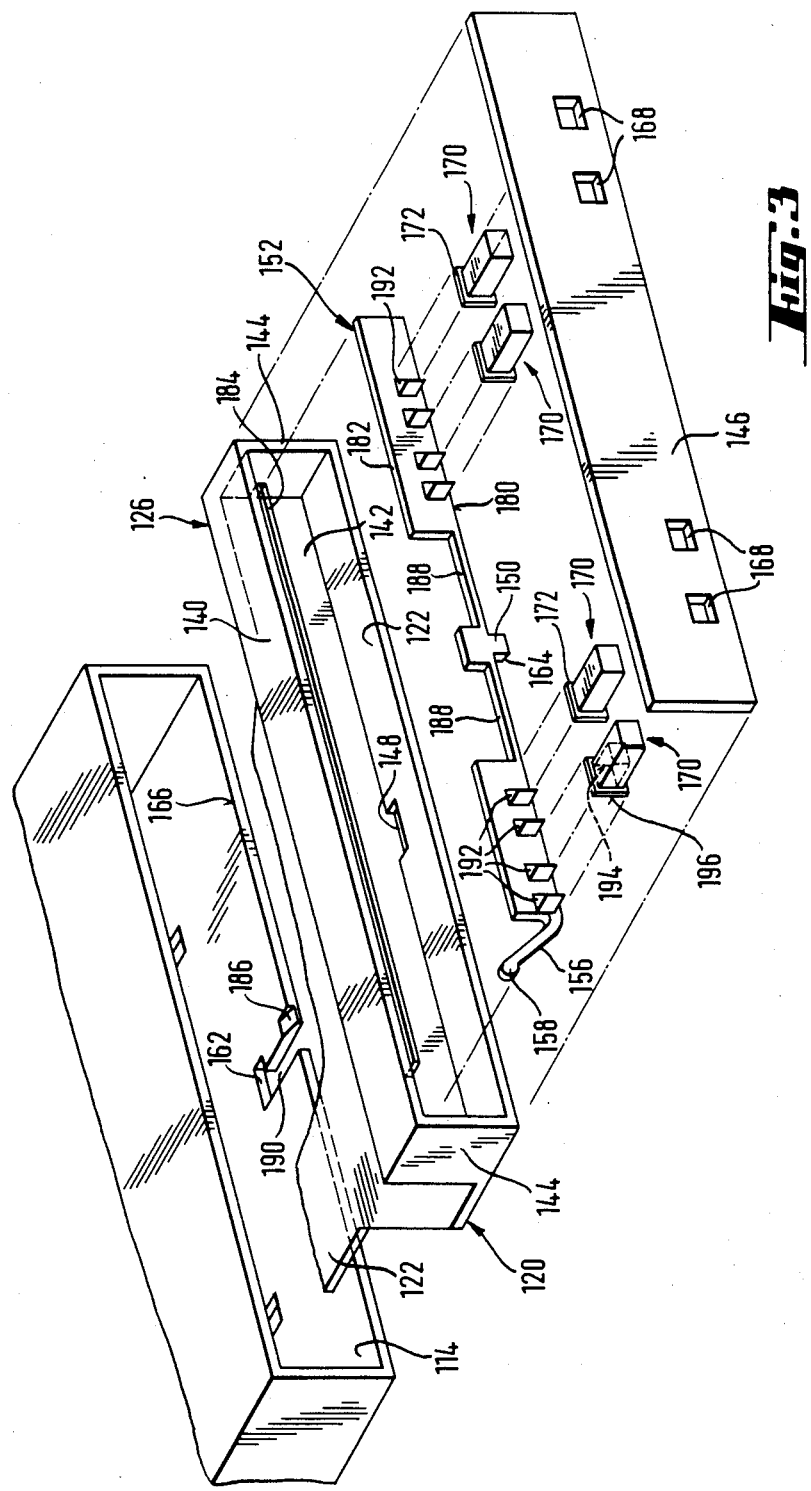

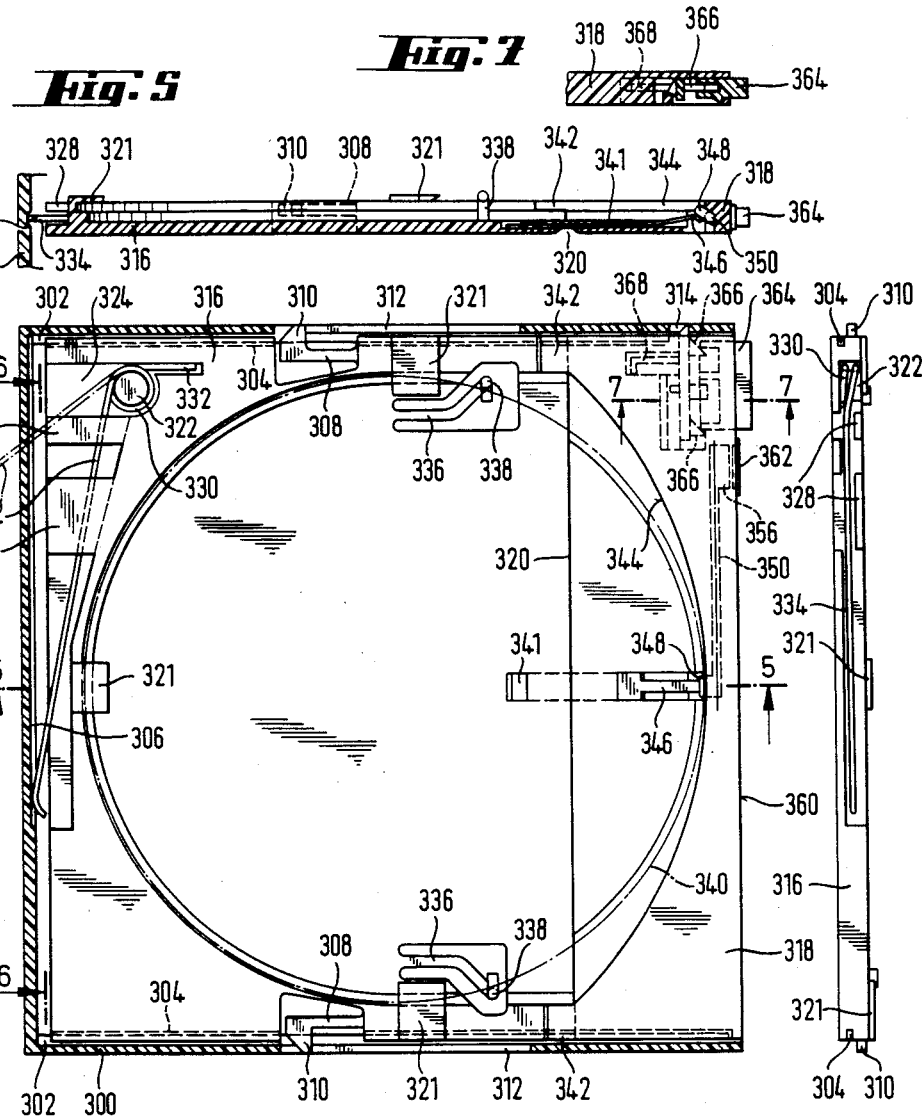

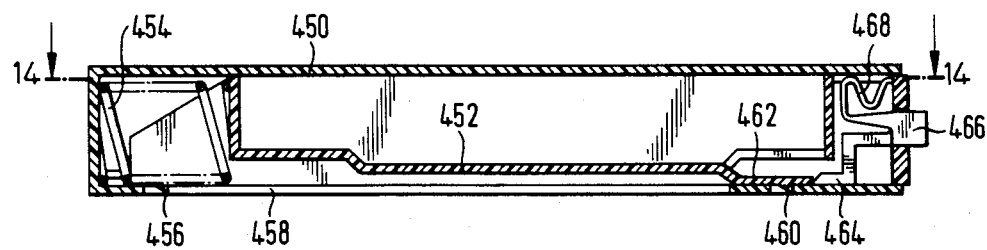
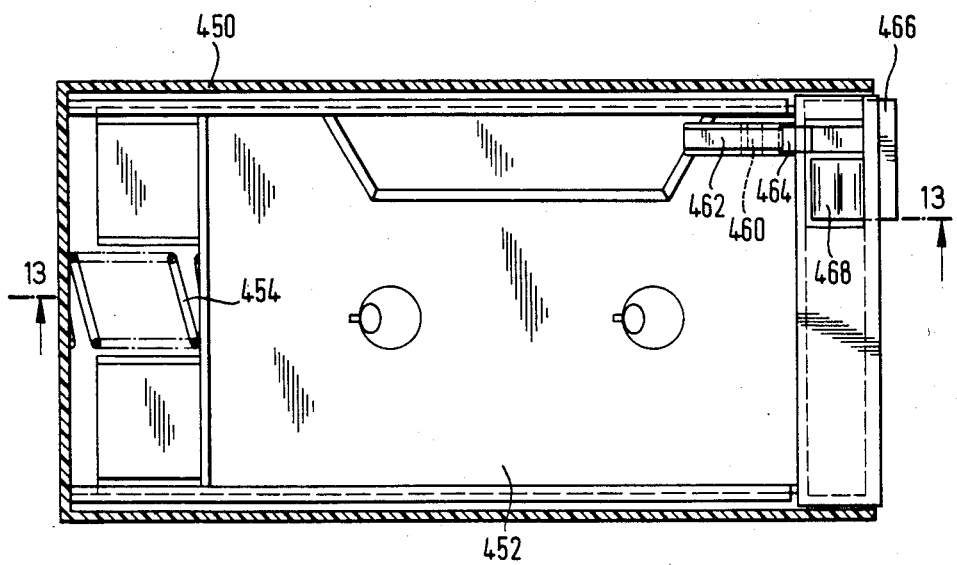

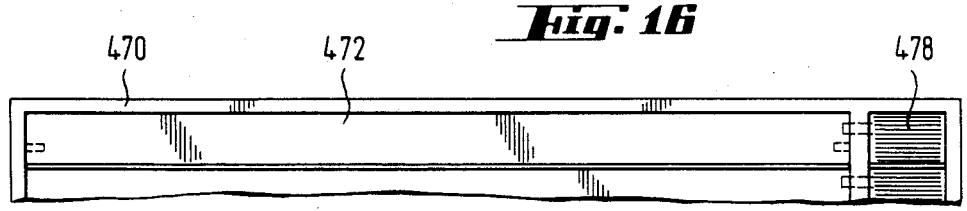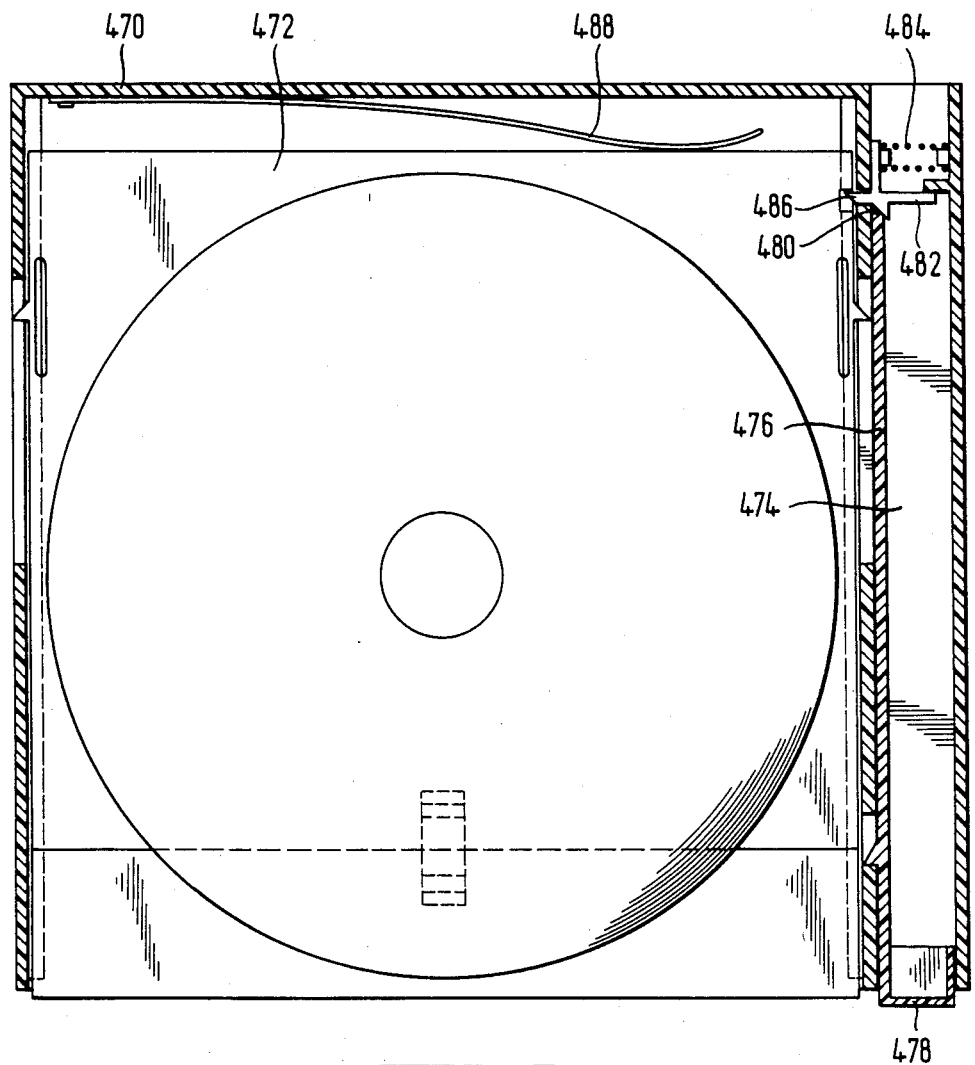

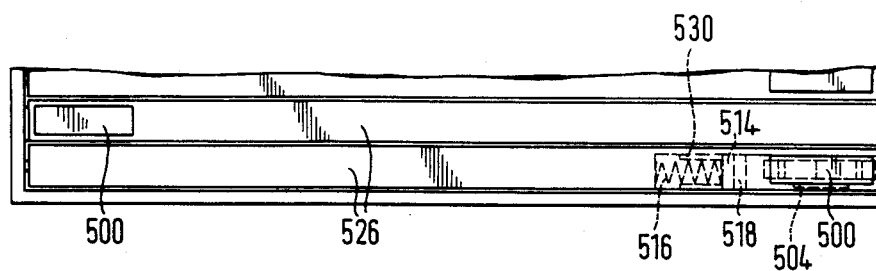
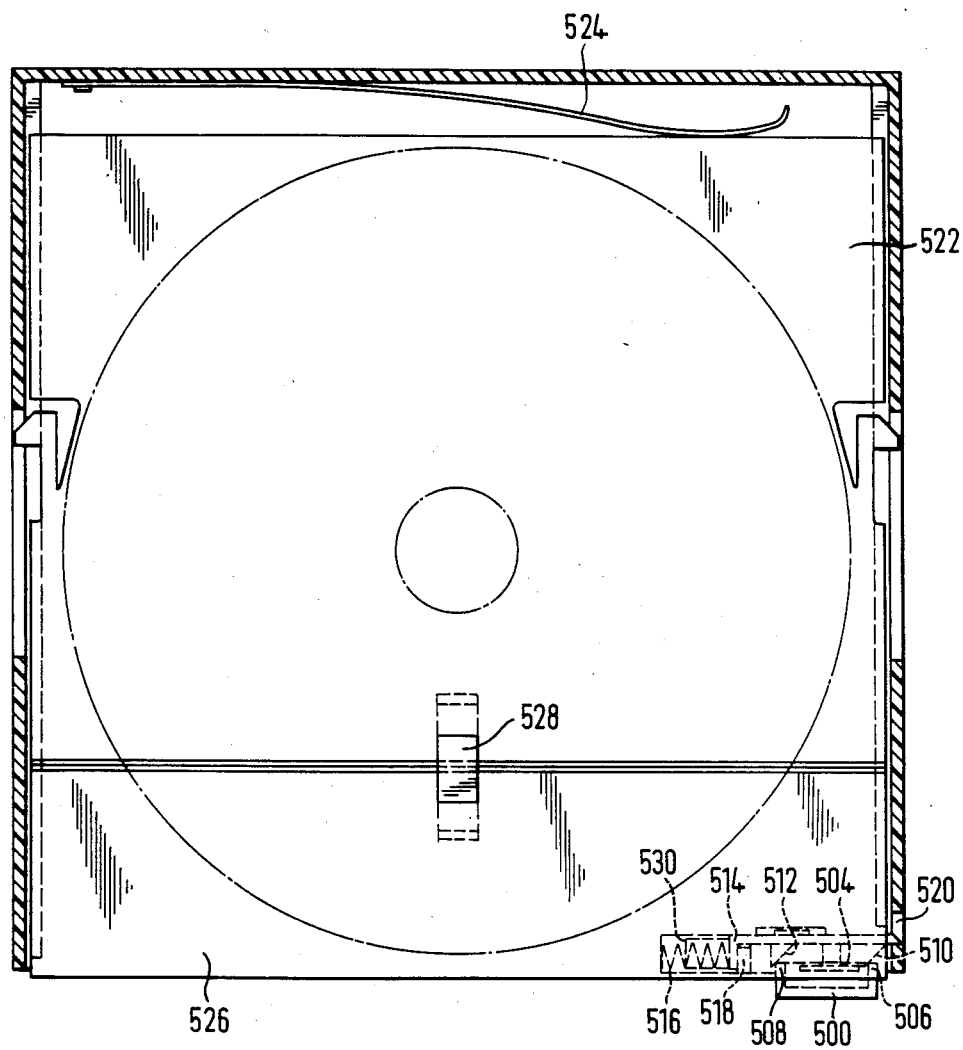

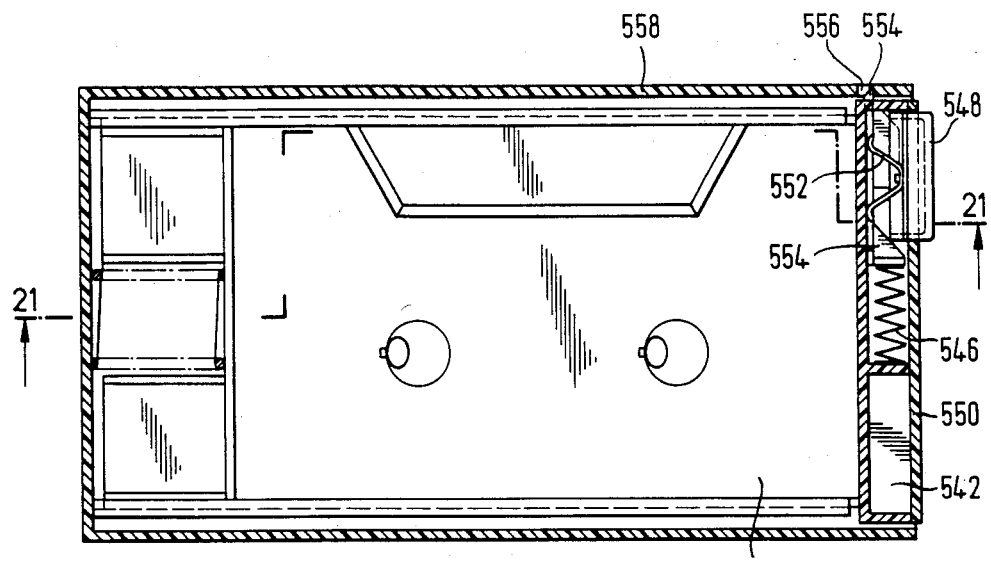
*Fig: 20*
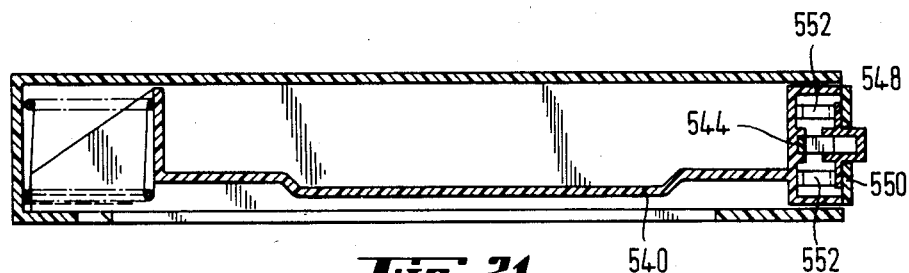
*Fig: 21*
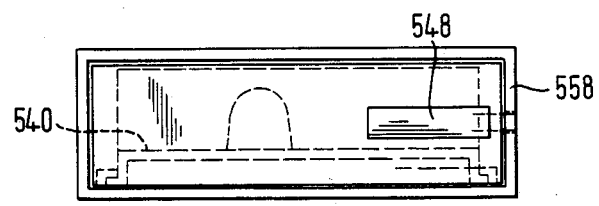
*Fig: 22*

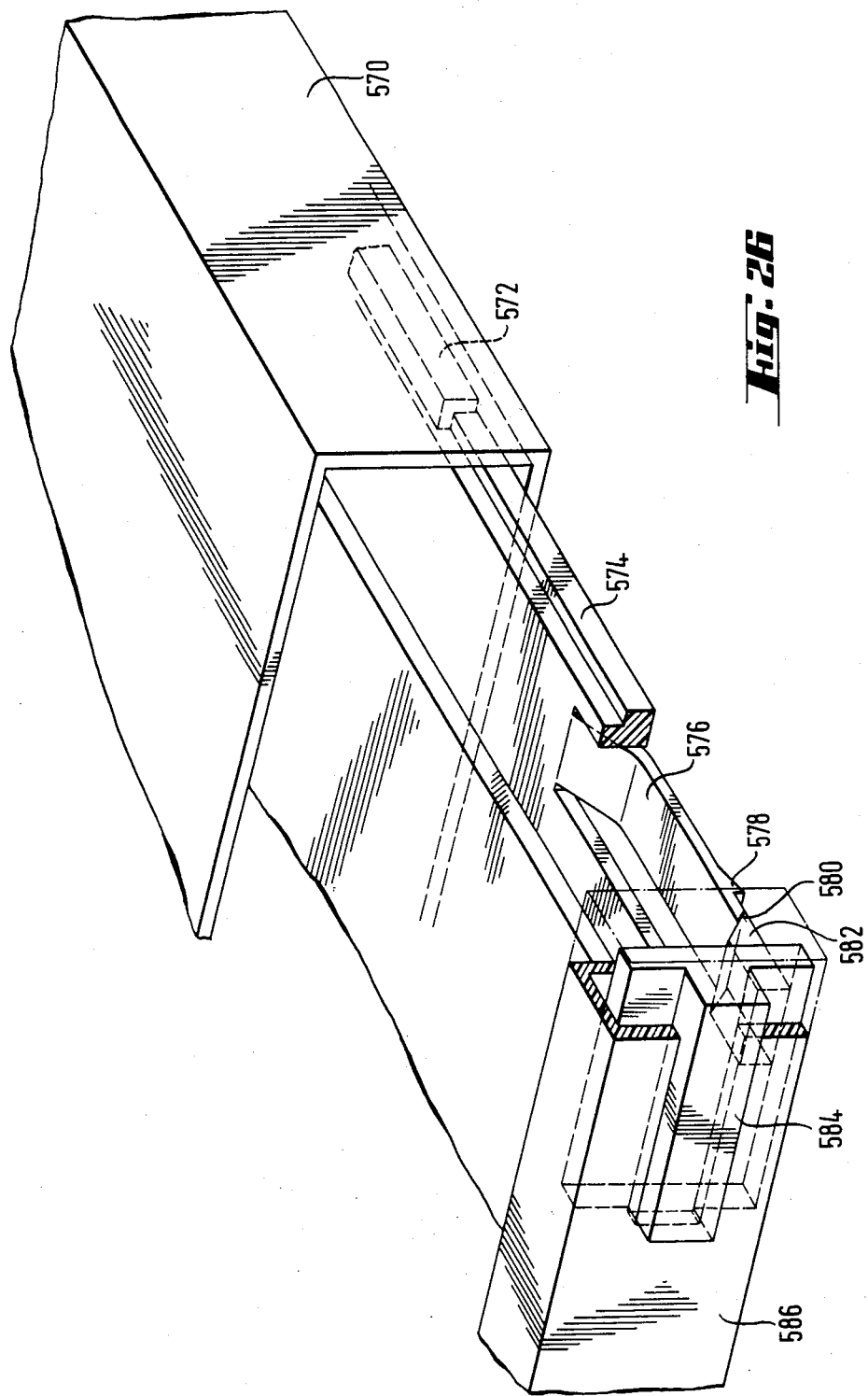

APPARATUS FOR STORING RECORDING MEDIA

BACKGROUND OF THE INVENTION (1) Field of the Invention

The present invention relates to the storage of recording media, for example magnetic tape cassettes and/or discs, and particularly to facilitating the intentional retrieval and return to storage of such recording media while minimizing the unintended release from the stored position of such media. More specifically, this invention is directed to apparatus for storing recording media which is especially well-suited for installation in motor vehicles. Accordingly, the general objects of the present invention are to provide novel and improved methods and apparatus of such character.

(2) Description of the Prior Art

Apparatus for storing recording media, such as magnetic tape cassettes, "compact" discs, standard records or video discs, is known in the art. An example of such apparatus may be seen from my co-pending application Ser. No. 645,068 filed Aug. 28, 1984. Recording media storage apparatus typically has a housing, customarily characterized by a rectangular cross-section, and one or more recording media supporting transport sliders which are movable relative to the housing. A transport slider conveys the recording media from a storage position, in which it or they are enclosed within the housing, to a removal position in which the selected recording media can be lifted from the transport slider. The transport slider will be resiliently biased toward the ejected, i.e., the recording media removal, position. Means must, of course, be provided to lock the transport slider in the housing against the resilient bias until such time as it is desired to retrieve a recording medium stored in the apparatus. In the apparatus of above-referenced application No. 645,068, the locking arrangement comprises elements which positively engage one another so as to automatically lock the transport slider in the housing when it is pushed into the housing from its ejected position. The locking arrangement includes a coupling element which is displaceable relative to one of the members being locked, i.e., the housing or transport slider, and is supported in the direction of movement of the transport slider.

Continuing to discuss the apparatus of application No. 645,068, the locking of the transport slider in the housing results from the coupling element coming into a locking engagement both with the transport slider and the housing when the slider is fully inserted and then allowed to move forward a slight distance under the influence of the resilient bias. Apparatus of the type disclosed in the referenced co-pending application is often, because of its compactness and reliability, installed in motor vehicles. While the position of installation will be dictated by the construction of the vehicle, an effort is always made to select an installation position which facilitates operation. In most cases this results in an installation wherein the direction of movement of the transport slider in the opening forward direction is opposite to the direction of travel of the vehicle.

Continuing to discuss the recording media storage apparatus of application No. 645,068, in order to retrieve a recording medium from the apparatus, the inserted transport slider is pushed a short distance further into the housing. This results in the coupling element being unlatched whereupon the transport slider will move to the open position under the influence of the resilient bias. The storage apparatus, if installed in a motor vehicle, will be subjected to the same forces as the vehicle, its components and also its passengers. In the typical mode of mounting, as described above, rapid deceleration of the vehicle will result in the transport slider, which would customarily be supporting a load in the form of a recording medium, moving relative to the housing in the unlocking direction. Thus, as a result of the inertia of the transport slider, it may become unintentionally released during, for example, emergency braking of the vehicle in which the storage apparatus is installed. This same undesirable characteristic is shared by other types of locking mechanisms wherein release is effected by urging the transport slider into the housing. An example of such an other type of locking mechanism for the transport slider of a recording media storage apparatus may be seen from Published Federal Republic of Germany Application No. 25 21 371.

Locking systems for transport sliders of recording media storage apparatus which require movement of a release member in a direction transverse to the direction of motion of the transport slider in order to unlatch the transport slider are also known. An example of such a system may be seen from German Pat. No. 22 48 408. In the apparatus of the above-referenced German Patent a release member is molded to the transport slider. The transport slider is unlocked by lifting the release member upwardly in a direction which is approximately perpendicular to the direction of movement of the transport slider. The release member is connected to the floor of the transport slider by means of a leaf spring and, during the release operation, executes a pivoting movement.

The use of a release mechanism of the type shown in German Pat. No. 22 48 408 does not eliminate the possibility of unintentional release of the transport slider during rapid vehicle deceleration since the inertial forces to which it will be subjected result in a turning moment acting on the release member. The possibility of unlocking is increased by the fact that the inertial forces acting on the transport slider and the recording media housed therein reduce or eliminate the frictional connection between the locking extension of the release member and the cooperating catch in the housing.

SUMMARY OF THE INVENTION

The present invention overcomes the above-briefly discussed and other deficiencies and disadvantages of the prior art by providing novel and improved techniques and apparatus for the storage and retrieval, in the environment of a motor vehicle, of recording media such as magnetic tape cassettes, "compact" discettes, conventional records and video discettes. Apparatus in accordance with the present invention is characterized by a locking arrangement which is substantially insensitive to acceleration or deceleration of the storage apparatus.

Recording media storage apparatus in accordance with the present invention comprises a housing, a transport slider guided for movement relative to the housing and configured to receive recording media, and a spring arrangement which biases the transport slider into the recording media removal position. Thus, the transport slider will be movable from a storage position within the housing to an outer removal position wherein a recording medium previously placed on the transport slider can be easily grasped by the user. Apparatus in accordance with the present invention further comprises a locking arrangement formed of elements which mechanically engage one another in the storage position of the transport slider so as to automatically lock the transport slider in the housing when it is pushed inwardly from its removal position. The locking arrangement includes at least one catch element which is displaceable relative to one of the members being locked, i.e., the housing or transport slider, but is supported so as not to be displaceable in the direction of movement of the transport slider. The locking arrangement further includes a release element for the catch element, the release element being guided so as to move substantially in the direction of insertion of the transport slider. The release element is resiliently biased to the locked position and, when operated, serves to unlock the catch element.

In accordance with the present invention the release element forms, together with the means which impart the resilient bias thereto, an oscillatory system. The appropriate dimensioning of the parts, particularly the mass of the release element and the resilient bias applied thereto, insures that deflection thereof sufficient to release the transport slider will occur only at rates of acceleration or deceleration which, considering the inertia of a loaded transport slider, will not be encountered under normal vehicle use including an impact from behind by another vehicle.

BRIEF DESCRIPTION OF THE DRAWING

The present invention may be better understood and its numerous objects and advantages will become apparent to those skilled in the art by reference to the accompanying drawing wherein:

FIG. 3 is a partial, exploded, perspective view of apparatus in accordance with a second embodiment of the present invention;

FIG. 4 is a cross-sectional view, with several elements shown in phantom, of a third embodiment of apparatus in accordance with the present invention, the apparatus of FIG. 4 being intended for use in the storage of "compact" discs and the view of FIG. 4 being taken in a direction perpendicular to a stored disc;

FIG. 5 is a partial cross-sectional side elevation view taken along line 5—5 of FIG. 4;

FIG. 6 is a side elevation view of the inwardly disposed edge of a disc holder of the apparatus of FIGS. 4 and 5, FIG. 6 being taken in the direction of line 6—6 of FIG. 4;

FIG. 7 is a partial cross-sectional view, taken along line 7—7 of FIG. 4, depicting the release button of the apparatus of FIGS. 4-6;

FIG. 13 is a schematic, cross-sectional view of apparatus in accordance with another embodiment of the present invention, the apparatus of FIG. 13 being intended for use in the storage of "compact" magnetic tape cassettes;

FIG. 14 is a cross-sectional view taken along line 14—14 of FIG. 13;

FIG. 15 is a view, similar to FIG. 10, schematically showing yet another embodiment of apparatus in accordance with the present invention;

FIG. 16 is a partial front view of the apparatus of FIG. 15;

FIG. 17 is a schematic illustration similar to FIG. 10 depicting still another embodiment of apparatus in accordance with the invention;

FIG. 18 is a partial front view of the apparatus of FIG. 17;

FIG. 20 is a schematic, cross-sectional top plan view of apparatus in accordance with another embodiment of the present invention;

FIG. 21 is a cross-sectional side elevation view taken along line 21—21 of FIG. 20;

FIG. 22 is a plan view, taken from the right-side, of the apparatus of FIGS. 20 and 21;

FIG. 26 is a partial, perspective view, with components being shown in phantom, of the embodiment of FIGS. 23-25.

DESCRIPTION OF THE DISCLOSED EMBODIMENTS

Figure 1:
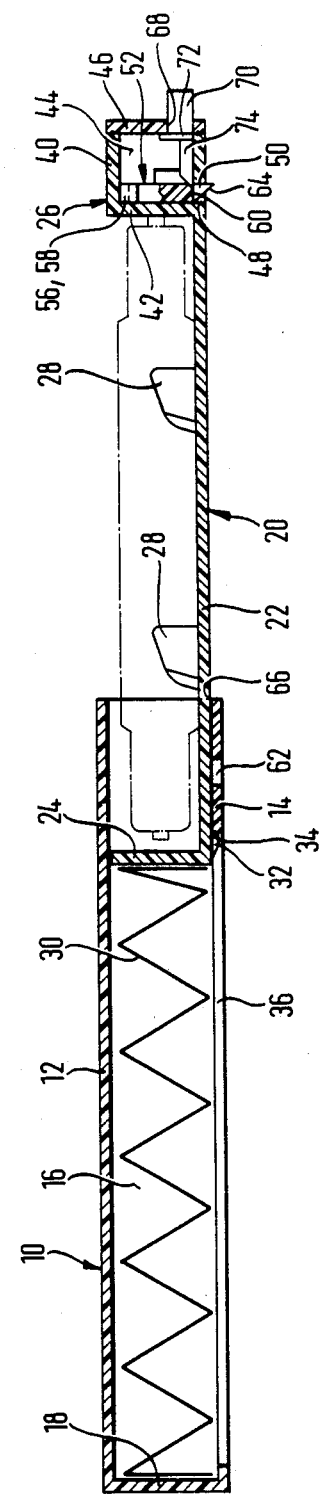
FIG. 1 is a schematic side elevation view, partly in section, of apparatus in accordance with a first embodiment of the present invention.
Figure 2:
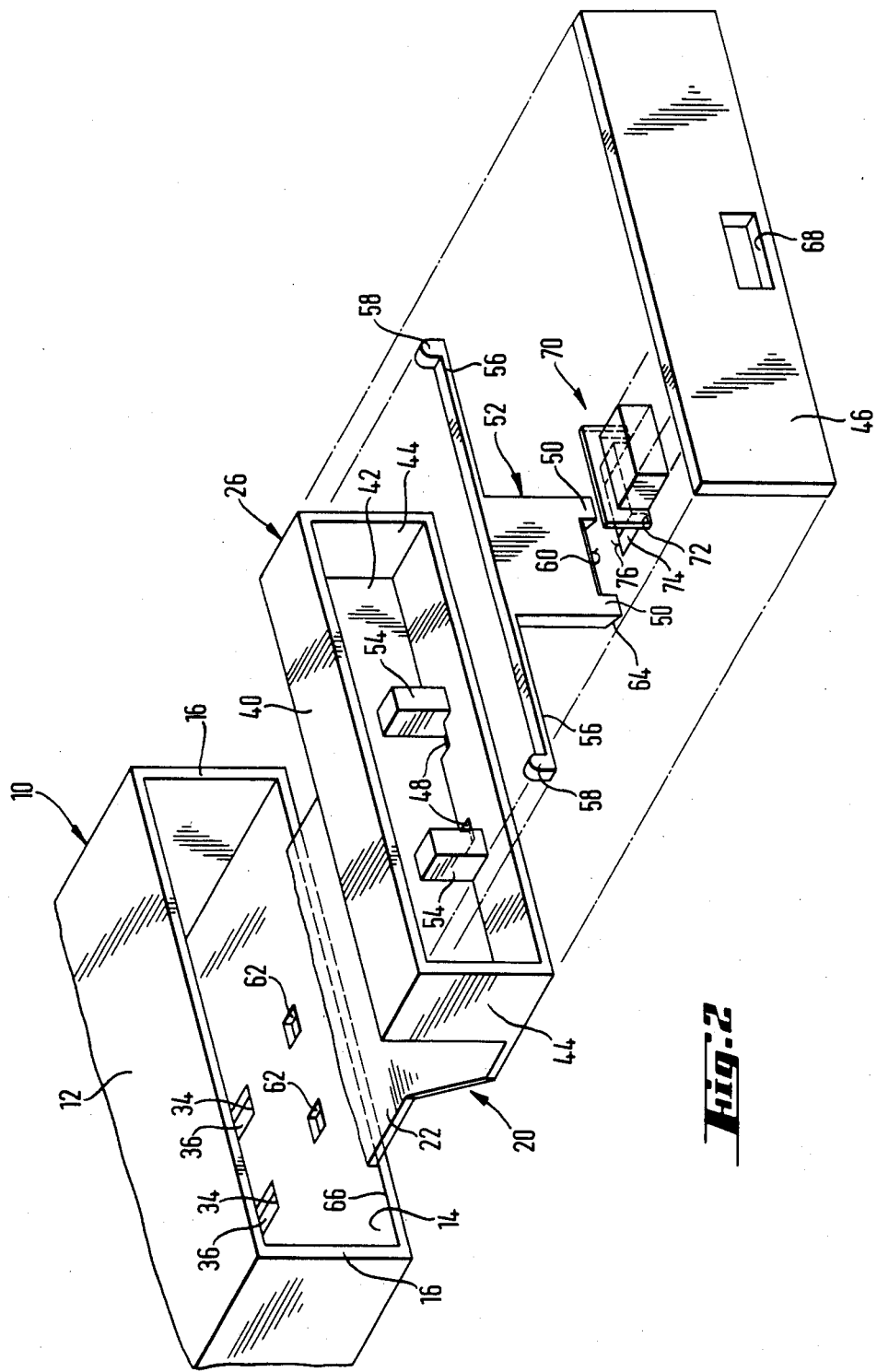
FIG. 2 is a partial, exploded, perspective view of the embodiment of FIG. 1.

With reference to FIGS. 1 and 2, apparatus in accordance with a first embodiment of the invention for storing a magnetic tape cassette is comprised of a housing, indicated generally at 10, and a transport slider, indicated generally at 20. Housing 10 has a top panel 12, a floor panel 14, a pair of oppositely disposed side walls 16 and a rear wall 18. The slider 20 includes a base plate 22, a back plate 24 and a catch mechanism housing indicated generally at 26. A pair of lugs 28 project upwardly from base plate 22 of slider 20 and serve to receive and lock the tape hubs of a magnetic tape cassette stored in the apparatus. A helical compression spring 30 biases slider 20 toward the open position in which it is shown in FIG. 1. The open position, i.e., the limit of motion in the open direction of slider 20, is defined by stop lugs 32 which are integral with the underside of base plate 22. The stop lugs 32 cooperate with the forwardly disposed ends 34 of parallel guide slots 36 provided in the upper side of the floor panel 14 of housing 10.

The catch housing 26 is also integral with the base plate 22 of slider 20. Catch housing 26 has a top wall 40, a rear wall 42 and a pair of oppositely disposed side walls 44. A portion of base plate 22 forms the bottom wall of the catch housing. The housing 10 and transport slider 20 are preferably injection molded from thermoplastic material. The front of catch housing 26 will be closed by means of a front plate 46. The front plate 46 can be secured to the catch housing 26 by adhesive bonding or, preferably, by ultrasonic welding. Centering means for front plate 46, for example an end flange which is complementary to the opening of catch housing 26, may be provided if desirable or necessary on the inwardly facing side of plate 46.

Inside catch housing 26, the slider base plate 22 is provided with a pair of spaced apertures 48. A catch or latch member, indicated generally at 52, is disposed within catch housing 26. The catch member 52 includes a pair of projections 50 which extend through and are movable relative to apertures 48. A pair of integral guide blocks 54 are provided on the interior of catch housing 26 adjacent to the apertures 48. The guide blocks 54 are spaced to define a channel for guiding movement of the center portion of catch member 52 in a direction transverse to the plane of base plate 22. The catch member 52 includes a pair of outwardly extending arms 56 which are provided, at the free ends thereof, with laterally extending end fingers 58. The fingers 58 extend in the opposite direction with respect to the projections 50. Catch member 52 is sized such that the fingers 58 lightly contact the underside of the top wall 40 of catch housing 26 when the bottom edge 60 of catch member 52 in the region between the projections 50 rests on the upper side of base plate 22. In this position the projections 50 pass through the apertures 48 and extend downwardly a distance which is slightly less than the thickness of the floor panel 14 of housing 10. In the inserted position of slider 20, the projections 50 will be received in apertures 62 in floor panel 14 of housing 10 and the cooperation between the projections 50 and the forward edge of the apertures 62 will retain the transport slider in the housing against the bias of the ejection spring 30. The projections 50 are provided, on the sides thereof which face toward the rear wall 18 of housing 10, with oblique surfaces 64. These oblique surfaces cooperate with the front edge 66 of the floor panel 14 of housing 10 during insertion of the transport slider to cause the catch member 52 to be cammed upwardly. When the catch member 52 is thus forced upwardly the arms 56 will be resiliently deformed thus permitting the transport slider to be pushed into the housing to the point where the projections 50 on catch member 52 drop into the apertures 62 in the housing floor panel 14. Thus, with the transport slider in either the inserted or the ejected position, there will be no resilient deformation of the arms 56 of catch member 52. For the reason which will become obvious from the description below, the edge 60 of catch member 52 is also provided with a bevel.

The front plate 46 of catch housing 26 has, in alignment with the edge 60 of catch member 52, an aperture 68. A release button, indicated generally at 70, extends through aperture 68. Release button 70 is sized so that it may slide, in the direction of movement of the transport slider 20, relative to front panel 46. Release button 70 is provided, on the inside of catch housing 26, with a flange 72. Flange 72 normally contacts the inner surface of front plate 46 about the periphery of aperture 68. When flange 72 is in contact with the inside of front plate 46, a wedge-like extension 74 of release button 70 will be in contact with the beveled edge 60 of catch member 52 in the region between the projections 50, the extension 74 having a portion which is complementary in shape to the bevel of edge 60. In order to unlock the transport slider, the user will press the release button 70 inwardly thereby causing the center region of catch member 52 to be urged upwardly against the resilient bias of the arms 56 until the projections 50 are lifted out of the apertures 62 in base panel 14 of housing 10. The dimensions of the parts are chosen such that the leading edge 76 of extension 74 of release button 70 will be spaced forwardly with respect to the rear wall 42 of catch housing 26 when the projections 50 clear the cooperating apertures 62. Accordingly, the ejection spring 30 can push the slider member outwardly a short distance thereby insuring that the projections 50 do not fall back into the apertures 62 when the user releases the release button 70. The user will apply force to the front plate 46 of catch housing 26 in order to return the transport slider 20 to the inserted position in housing 10.

It is to be noted that, when the deforming force is removed from catch member 52, and thus the arms 56 are released from tension, the release button 70 will be driven back into its rest position as a result of the cooperation between the beveled surfaces on extensions 74 and edge 60 of catch member 52.

In accordance with the preferred embodiment, catch member 52 and release button 70 are also injection-molded from thermoplastic material. Since the arms 56 of catch member 52 are subjected to resilient deformation only briefly during ejection and insertion of the transport slider, there is no risk of permanent deformation thereof due to cold flow.

In the embodiment of FIG. 3, a catch indicated generally at 152 is supported within a catch housing, indicated generally at 126, so that it can slide in a direction which is normal to the direction of movement of the transport slider 120. The lower edge 180 of catch 152 rests on the base plate 22 of the transport slider 120 while the upper edge 182 of catch 152 lightly contacts a guide rib 184 which is integral with and extends from the rear wall 142 of catch housing 126. At one end thereof, the left end in the case of the embodiment of FIG. 3, the catch 152 is provided with an integral spring arm 156 which terminates, at its free end, in a rounded end finger 158. Upon assembly of the apparatus the end finger 158 will be located in the corner defined by the junction of the top wall 144 and a side wall 144 of catch housing 126. At approximately the mid-point thereof, the catch 152 is provided with a locking projection 150 which passes through an aperture 140 provided in the base plate 122 of the catch housing 126. When the transport slider 126 is in the inserted position, the projection 150 will be engaged in an aperture 162 in the floor panel 114 of the housing. For the purposes to be described below, the catch 152 is provided, in regions to either side of projection 150, with narrow connecting arms 188.

As in the case of the projections 50 of the embodiment of FIGS. 1 and 2, the projection 150 of the FIG. 3 embodiment is provided with an oblique or beveled surface 164 which extends upwardly and inwardly toward the rear of the housing. The oblique surface 164 of projection 150 is designed to cooperate with a complementary ramp surface 186 on the forward edge of bottom panel 114 of the housing. Accordingly, when the transport slider 120 is inserted in the housing, the cooperation between the complementary wedge surfaces 164 and 186 will result in the connecting arm portions 188 of catch 152 being resiliently deformed to the degree necessary to allow the projection 150 to move upwardly over the floor panel 144 of the housing until it drops into the aperture 162 whereupon the connecting arms 188 will be released from tension. When catch 152 is displaced laterally with respect to the longitudinal axis of the transport slider, i.e., to the left as the apparatus is depicted in FIG. 3, the spring arm 156 will be deformed and the projection 150 will move into alignment with a slot 190 which communicates between the front edge 166 of the housing floor panel 114 and aperture 162. When projection 150 is brought into alignment with slot 190, the transport slider 120 will be ejected from the housing under the action of the ejection spring. The projection 150 will be guided along slot 190 during the ejection stroke. When the projection 150 clears the front edge 166 of the housing floor panel 144 the spring arm 156 will be unloaded and, in the course of unloading, will cause the catch 152 to move to the right to return to its initial position.

The catch 152 of the FIG. 3 embodiment is also provided, on the side thereof which faces the front panel 146 of catch housing 126, with pairs of integral wedge-like projections 192. The wedges 192 will, of course, be formed on those portions of the catch 152 which are positioned outwardly with respect to the resilient connecting arms 188. As the apparatus is shown in FIG. 3, a release button 170 is associated with each pair of wedges 192. The release buttons 170 are guided in associated apertures 168 in the front panel 146 and are supported at their inner ends by means of flanges 172. The release buttons 170 are hollow, as may be seen from the showing in phantom on the button 170 disposed at the left as the apparatus is shown in FIG. 3. One edge 194 of the recess within the button and an outer edge 196 defined by a flange 172 will respectively cooperate with the wedges of an adjacent pair of wedges such that, when pressure is exerted on the release button, the catch 152 will be caused to move laterally against the resilient bias of the spring arm 156. The dimensions of the parts are such that the operation during release is analogous to that described above in the description of the embodiment of FIGS. 1 and 2. The aperture 148 in the floor panel 122 of catch housing 126 does not interfere with the release operation since aperture 148 will be sufficiently wide to accommodate the requisite movement of projection 150, i.e., the aperture 148 is wider than the aperture 48 of the embodiment of FIGS. 1 and 2.

As the apparatus is shown in FIG. 3, it is possible to release the transport slider 120 from the locked position within the housing by pressing any one of the release buttons 170. Apparatus in accordance with the FIG. 3 embodiment may serve to house, in a single transport slider, a plurality of transport plates. By way of example only, the apparatus of FIG. 3 may be employed for the storage of compact discs and a separate selectable transport plate provided for each disc. In this case, the release buttons 170 may also serve to select a particular carrier plate for ejection along with the transport slider, the other carrier plates remaining in the housing. For a detailed description of the manner in which the release buttons may function to select one of a plurality of carrier plates, reference may be had to co-pending application No. 645,068.

FIGS. 4-9 show a further embodiment of the present invention wherein a transport slider, hereinafter referred to as the "holder", is provided for each of a plurality of compact discs.

A plurality of disc holders will be received in a housing 300 which is only partly shown. Guide ribs 302 are formed integrally with and extend inwardly from the side walls of housing 300. The guide ribs 302 are received in complementary guide grooves 304 of the disc holders, each disc holder including a main plate member 316. The housing 300 is also provided with spring arm receiving grooves 306 formed in the inside of the rear wall thereof, the grooves 306 facing toward the open front side of housing 300 through which the disc holders move. The disc holders are substantially plate-shaped and are provided with integral arms 308 which terminate in outwardly extending hook-like stop extensions 310. The stop extensions 310 are engaged in lateral slots 312 in the side walls of housing 300. The arms 308 have a degree of resiliency so that, when the disc holders are inserted in the housing during assembly, the stop extensions 310 will be deflected inwardly until they come into alignment with the slots 312. The housing 300 is also provided with an aperture 314 in a side wall thereof for each disc holder, the apertures 314 typically being alternated between sides for adjacent disc holders. As will be described in greater detail below, the apertures 314 function as catches for the locking of the disc holders in housing 300.

As noted above, the disc holders each comprise a generally plate-shaped member 316 which has a dished or troughed configuration and, integral therewith, a front wall defining unit 318. The front wall defining unit 318 is articulated to the main plate member 316 by means of a so-called "film link" or web 320 which, as may be clearly seen from FIG. 9, functions as a hinge. The main plate member 316 of each disc holder is provided with three retaining lugs 321 which extend outwardly over the dished portion thereof for the purposes of capturing a compact disc placed on the holder. Each of the plate members 316 is further provided, adjacent a corner which will face the rear wall of the housing 300, with an integral pedestal 322. The pedestal 322 is actually disposed in a depression or recess 324 of the plate member 316. A pair of support projections 328 overlie the recess 324. The recess 324 is provided with cut-outs in the region underlying the support projections 328. The helix 330 of a helical torsion spring is received on pedestal 322. The shorter arm 332 of the helical torsion spring is captured in a narrow slot provided therefor in plate member 316 while the longer spring arm 334 extends obliquely toward the rear wall 306 of housing 300. The untensioned position of arm 334 of the helical torsion spring is indicated by broken lines in FIG. 4.

The helical torsion spring is formed such that the arm 334 is situated in the plane of the disc holder, this positioning being insured by the cooperation between the support projections 328 and the base of recession 324 with the spring arm 334 passing therebetween as shown in solid lines in FIG. 4. The free end of the spring arms 334 are bent into an arcuate shape and are received in respective associated grooves 306 in the rear wall of housing 300. This results in each disc holder being biased in the ejection direction since the helical torsion spring is normally in the "loaded" condition. Thus, upon unlocking, the disc holder will be urged to the right as the apparatus is shown in FIG. 4 with the arcuate end portion of spring arm 334 sliding along the groove 306 in the rear wall of the housing 300.

The main plate member 316 is also provided with a pair of oppositely disposed apertures into which resilient tongues 336 extend. The free ends 338 of the tongues 336 are angled upwardly and turned inwardly. When a disc 340 is mounted on the disc holder, the angled portions 338 of tongues 336 will contact the edge of the disc, as may be seen from FIG. 4, when the disc is pushed completely into the holder. The tongues 336 prevent the separation of a disc from the holder when the holder is unlocked and moves to the ejected position under the influence of the helical torsion spring. The resilient tongues 336 also provide for vibration damping when the embodiment of FIGS. 4–9 is utilized in the environment of a motor vehicle. The resilient tongues 336 insure that a disc reliably reaches its end position during the loading thereof onto a holder since, when the axis of rotation of a disc being inserted moves beyond the line defined by the angled portions 338, the resilient tongues 336 will exert a force in the loading direction. There will, of course, also be a noticeable reduction in the braking force of the tongues on the disc which the user will feel and thus the user can be certain that the disc is securely stowed whereupon the front wall unit 318 may be rotated upwardly and the disc holder inserted in the housing. The shape of the tongues 336, and particularly the ends thereof which are bent upwardly generally at right-angles, insures that a disc being loaded onto a holder cannot slip beneath a tongue.

At the center of the film link or integral hinge 320, a leaf spring 341 which bridges the film link is inserted into corresponding apertures in the plate member 316 and the front wall unit 318. The leaf spring 341 biases the front wall unit 318 to the downwardly angled position depicted in FIG. 9 and, at the same time, forms a stop to limit this opening movement. In the region of the lateral ends of the film link 320, the front wall unit 318 is provided with a pair of extensions 342 which are received in complementary cut-outs in plate member 316. When the front wall unit 318 is in the downwardly pivoted position of FIG. 9, the extensions 342 block insertion of the disc holder into the housing by contacting the front wall of the adjacent disc holder or, in the case of the uppermost holder, by contacting the top panel of the housing. Without this precaution it would be possible for the user to attempt to insert the holder by pressing on the exposed edge of the disc supported thereon in which case the front wall unit 318 would pivot upwardly thus pinching the fingers of the user. The blocking effect is indicated by the broken line showing on FIG. 9. The front wall unit 318 constitutes a forward extension of the main plate member 316, the dish-shaped depression over which a compact disc is extends and the guide grooves 304 extending into the front wall unit 318. The contour of the dish-shaped depression in the front wall unit 318 is indicated at 344.

Figure 8:
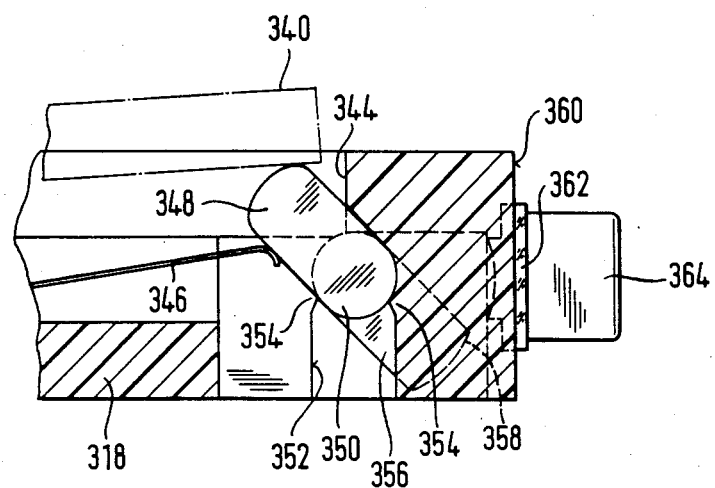
FIG. 8 is an enlarged view of a portion of the apparatus as shown in FIG. 5.
Figure 9:
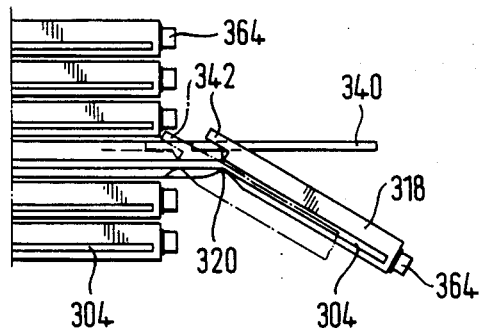
FIG. 9 is a partial side view, also taken in the same direction as FIG. 5, which depicts the articulated construction of a transport slider for use in the apparatus of FIGS. 4-8.

As may be best seen from FIG. 8, a narrow end strip 346 of leaf spring 341 is angled slightly upwardly and projects beneath a feeler arm 348 at one end of a pivoted lever. The lever is mounted on one end of a spindle or axle 350 which is rotatably supported at the base of an elongated recess 352. The recess 352 extends upwardly from th underside of the front wall unit 318 and extends parallel to the front panel 360 over approximately half its width. The recess 352 is provided with a portion of reduced width 354 so that the lever spindle 350, once snapped into position, will be permanently captured. At the other end of spindle 350, i.e., the end disposed oppositely with respect to feeler arm 348, an indicating arm 356 is provided. The indicating arm 356 is off-set by 180° with respect to the feeler arm.

The end face 358 of the indicating arm 356 is colored or provided with some other kind of marking which can be seen through a window 362 which is inserted in front panel 360 of front wall unit 318. The edge of a disc 340 inserted in a holder will press on the feeler arm 348 as may be seen in FIG. 8. When the disc is fully inserted the end strip 346 of spring 341 will be deflected and the spindle 350 will be pivoted thus causing the end face 358 of the arm 356 to be rotated to the position where it appears behind the window 362. Accordingly, the appearance of color or other indicia in a window 362 will be an indication that the holder having that window is loaded with a disc. With no disc on the holder, the spring end strip 346 will cause the feeler arm 348 and thus spindle 350 to rotate back to the position shown in FIG. 8.

A release button 364 extends through the front panel 360 of the front wall unit in the region between window 362 and the housing side wall which is in closest proximity thereto. The release button 364 is displaceable normal to the plane defined by panel 360 in response to finger pressure. Release button 364 cooperates with a pair of wedges 366 which are integral with a lever or catch which is displaceable in a direction parallel to front panel 360. The lever or catch is biased, into the latched position depicted in FIG. 4, by a spring arm 368. The release button—catch arrangement of the embodiment of FIGS. 4–9 operates in substantially the same manner as that described above in th discussion of FIG. 3.

In the initial assembly of the recording media storage apparatus of FIGS. 4–9, as may be seen from FIG. 7, the release button 364 is inserted in the aperture provided therefor in front panel 360 from the front while the catch, which includes the wedges 366, is inserted into the front wall unit 318 from below. In the interest of facilitating understanding of the invention, the projections provided on these members which enable them to be snapped into position and captured in the front wall unit have not been shown in the drawing.

In order to facilitate operation of the apparatus, bearing in mind that the overall height of each disc holder is quite small, the release buttons 364 and indicating arms 356 are arranged alternately on the right and left for adjacent disc holders.

The embodiment of invention depicted in FIGS. 4–9 has been shown and described in considerable detail. It is believed that those skilled in the art will, as a result of the description of all of the FIGS. 1–9, understand the construction and operation of the embodiments of FIGS. 10–26 which will be discussed below. Accordingly, the embodiments of FIGS. 10–26 have been shown in diagramatic form and the following description thereof is limited to their salient features.

Figure 10:
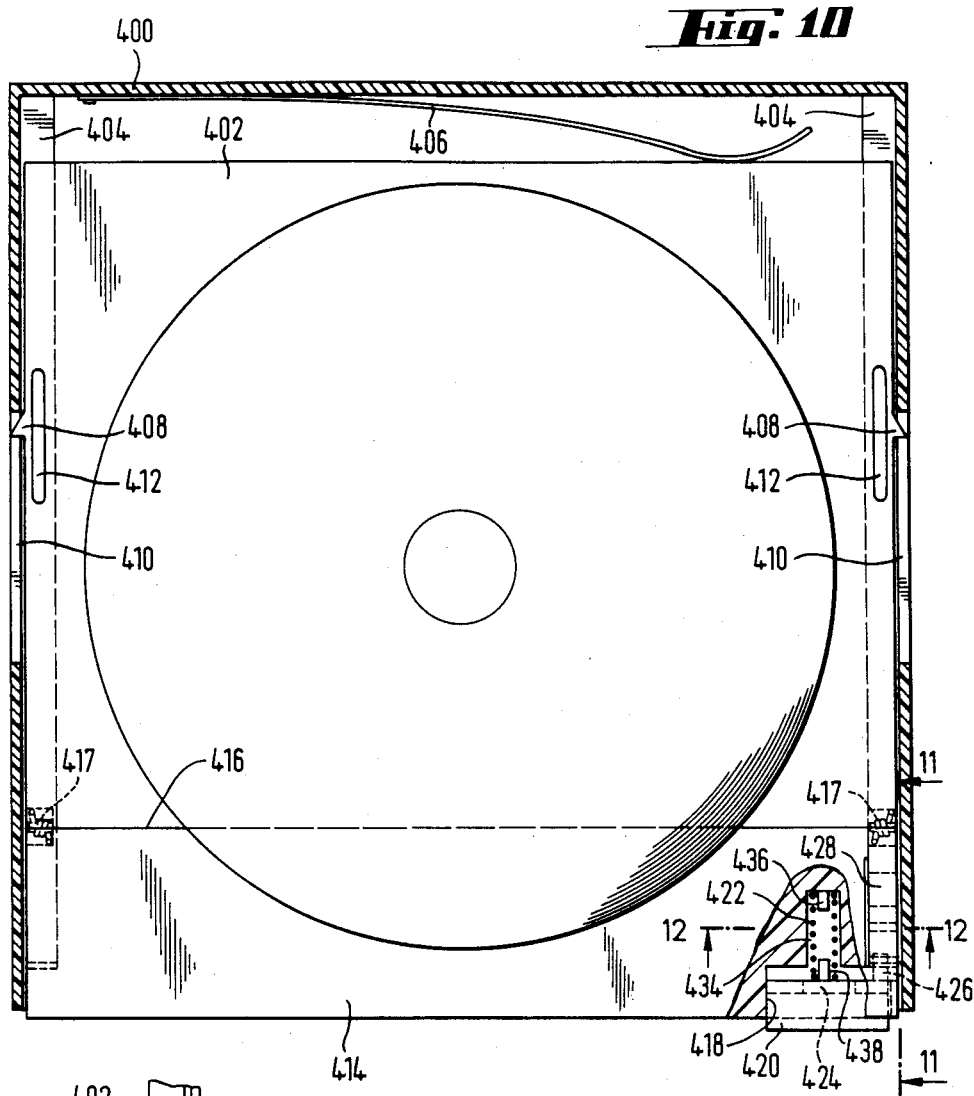
FIG. 10 is a schematic illustration of apparatus in accordance with a further embodiment of the present invention, FIG. 10 being a sectional view parallel to the direction of movement of a transport slider designed for carrying a compact disc and being partly broken away to show details of the release mechanism.
Figure 11:
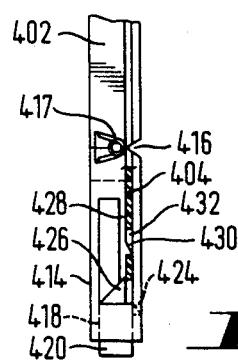
FIG. 11 is a partial side view of the transport slider of FIG. 10 taken along line 11—11 of FIG. 10.
Figure 12:
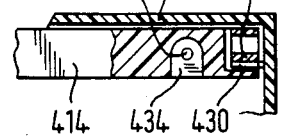
FIG. 12 is a partial sectional view of the apparatus of FIG. 10, FIG. 12 being a view taken along line 12—12 of FIG. 10.

FIGS. 10–12 depict a further embodiment of the present invention designed for use in the storage of compact discs. This further embodiment comprises a housing 400, a plurality of transport slider members 402 constructed as disc holders and guide rails 404 which engage lateral grooves in the transport sliders. The guide rails 404 are molded to the inside of the side walls of housing 400 and guide and support the transport sliders 402. A leaf-type ejector spring 406 is associated with each slider 402 and the limit of travel of the sliders in the ejection direction is limited by integral stop projections 408 which are engaged in slots 410 in the sides of housing 400. Slots 412 are formed in the sliders 402 immediately inwardly with respect to the stop projections 412 and the projections 408 are provided with obliquely angled rearwardly facing surfaces. Accordingly, during assembly of the storage apparatus, the stop projections 408 will be cammed inwardly, such inward motion being permitted by the resilient webs defined by slots 412, until such time as the projections snap outwardly into the slots 410. As in the embodiment of FIGS. 4-9, each transport slider includes a front wall unit 414 which is joined to the main portion of the slider by means of a film link or web 416. The film link or web 416 is biased to the folded down position by a pair of leg-and-collar springs 417. The front wall unit 414 is provided, adjacent one side edge thereof, with an outwardly opening guide slot 418. A release button 420 is positioned in slot 418 and is biased outwardly by means of a helical spring 422. A stop 424 which is integral with button 420 insures the retention of the release button in the guide slot 418. In the rest position shown in FIG. 10, the narrow leading edge of a wedge 426 which is integral with release button 420 lies immediately in front of a complementary oblique surface provided on a leaf spring 428. The leaf spring 428 is, in turn, integral with the front wall unit 414 and includes, on the side thereof which faces a guide rail 404 on the side of housing 400, with a projection 430 which engages an aperture 432 in the guide rail 404. The leaf spring 428 is, in actual practice, part of the web which is situated above the guide groove in the side of the main portion of the transport slider 402. The helical spring 422 is inserted through an opening in the floor 434 of the front end unit 414 and is captured by pins 436 and 438. Pin 436 is integral with the front wall unit while pin 438 is integral with the release button 420. The manner in which the pressing of release button 420 will cause deflection of leaf spring 428 to disengage projection 430 from the aperture 432 in the side rail 404 can clearly be seen from FIG. 11.

The embodiment of FIGS. 13 and 14 has been designed for use in the storage of compact magnetic tape cassettes, i.e., the so-called "Phillips" cassettes. The storage apparatus of FIGS. 13 and 14 includes a housing 450, a transport slider 452 and an ejection spring 454. The travel of transport slider 452 in the ejection direction is limited by means of stops 456 which travel in slots 458 in the floor of the housing 450. The locking of the transport slider 452 in the storage position is effected by means of a hook or projection 460 which is integral with a leaf spring member 462. The hook 460 engages an aperture in the floor of housing 450. The leaf spring 462 is formed from the material which comprises the floor of transport slider 452 and the forwardly facing end thereof is beveled so as to extend downwardly and inwardly. The beveled end of leaf spring 462 cooperates with a wedge extension 464 of a release button 466. In accordance with the preferred construction of apparatus pursuant to FIGS. 13 and 14, the release button 466 is integral with the transport slider 452, the entire sub-assembly being formed by injection molding, but is movable with respect to the remainder of the transport slider. Thus, as the apparatus is shown, the release button 466 is connected to the remainder of the transport slider by means of resiliently deformable intermediate members 468. The intermediate members 468 lie, as may be seen from FIG. 14, adjacent the wedge extension 464 and it will be appreciated by those skilled in the art that the fabrication of such a part does not require a highly complicated molding die.

The embodiment of FIGS. 15 and 16 is intended for the storage of compact discs and includes a plurality of plate-like disc holders 472 supported for linear movement in a housing 470. The housing 470 is formed with a longitudinal channel 474 extending parallel to and along one of the side edges thereof. A plunger 476, which may be actuated by means of a release button 478, is disposed within channel 474 and guided by one of the channel defining walls. A catch 482, having a wedge-shaped projection 480, is biased against one side wall of the channel, adjacent the inwardly disposed end thereof, by means of a compression spring 484. The catch 482 is capable of a limited degree of movement against the bias of spring 484, the catch sliding on a guide flange during such movement. The catch 482 has a second projection 486 which extends in a direction which is generally transverse to projection 480. The projection 486 extends through the inside channel defining wall in housing 470 and engages a recess in the transport slider 472. Spring loaded catch 482 normally prevents the transport slider from being ejected from housing 470 under the influence of a leaf-type ejection spring 488. When the release button 478 is pressed inwardly, the inner end of plunger 476 cooperates with the oblique surface on the wedge-shaped projection 480 to force catch 482 to the right as the apparatus is depicted in FIG. 15. This movement to the right will unlock the transport slider whereupon it will be ejected by leaf spring 488.

Figure 19:
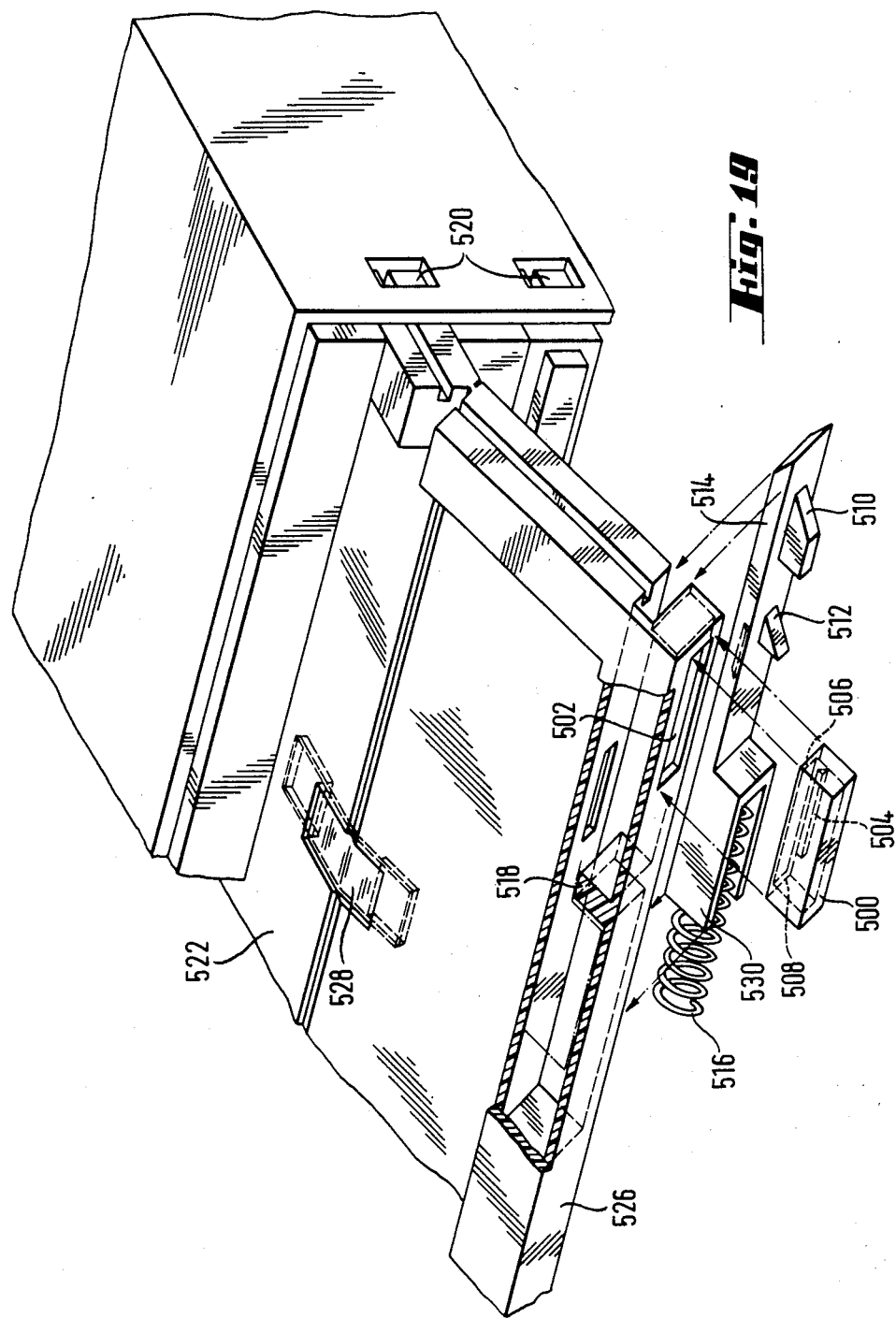
FIG. 19 is a partial perspective view of the apparatus of FIGS. 17 and 18 with the transport slider being shown in the opened state.
Figure 23:
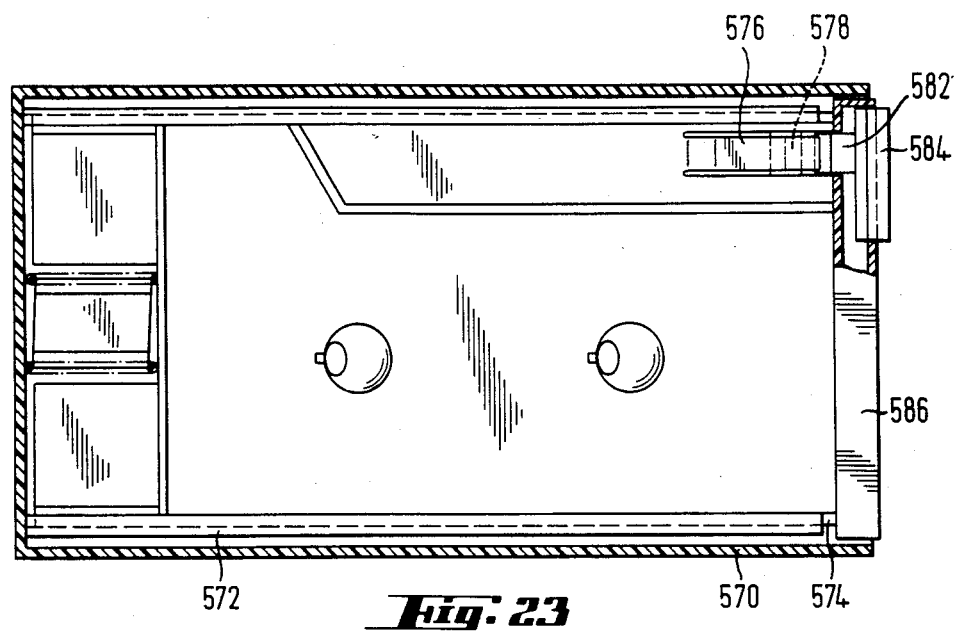
FIGS. 23, 24 and 25 are schematic illustrations respectively similar to FIGS. 20, 21 and 22 of a further embodiment of apparatus in accordance with the present invention.
Figure 24:
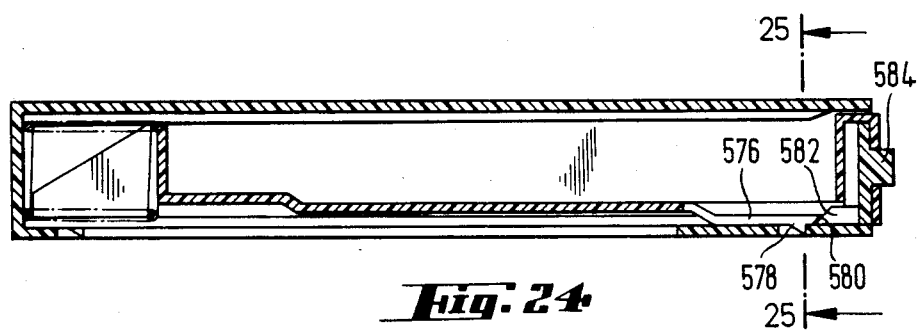
Figure 25:
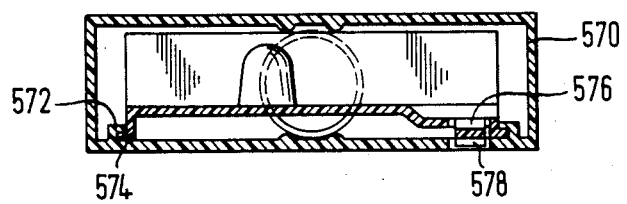

The embodiment of FIGS. 17-19 is similar to that of FIGS. 10-12 and includes a release button 500 which is guided in an aperture 502 provided in the front wall unit 526 of each of the disc holders 522. The release button 500 is captured in the front wall unit by means of a molded stop 504. The release button 500, in the manner described above, cooperates with a catch 514, i.e., edges 506, 508 of the release button respectively engage surfaces 510, 512 of wedge-like projections on the catch and cause movement of the catch in a direction transverse to the direction of movement of the button. The catch 514 is urged, by a helical spring 516, against a stop 518. When the catch is in contact with stop 518 the end thereof will be engaged in an aperture 520 in the side wall of the housing. The depression of the release button 500 will cause the catch 514 to move to the left as the apparatus is depicted thus overcoming the bias of sprin9 516 and withdrawing the end of the catch from the aperture 520 in the housing side wall. With the catch thus unlocked, the disc holder 522 will be ejected from the housing by a leaf spring 524. During ejection, the front wall unit 526 will pivot downwardly with respect to the main portion of the disc holder 522 under the influence of a leaf spring 528.

The catch 514 is received in a channel which is open at the bottom of the front wall unit 526 and is retained in the channel by the subsequent snapping in of the release button 500. The spring 516 is maintained in position by means of an extension 530 of catch 514. It will be appreciated that the catch/release button assembly can be "turned" and installed at the other side of the holder. This permits, as indicated in FIG. 18, the release buttons to be alternated from side to side on adjacent disc holders thus facilitating use of the storage apparatus.

The embodiments of FIGS. 20-22 and 23-26 are designed for use in the storage of magnetic tape cassettes, especially compact cassettes. In the embodiment of FIGS. 20-22 the frontal region of the transport slider 540 is of double-walled construction and defines a cavity 542. The catch 544, biasing spring 546 and a pair of further small leaf springs 552 are all disposed within cavity 542. The release button 548 extends through an opening provided therefor in the front wall 550 of the transport slider. The front wall 550 will be defined by a cover plate which, by way of example, is affixed to the remainder of the transport slider to define the double-walled frontal region by means of ultrasonic welding. The release button 548, in the embodiment of FIGS. 20–22, is provided with its own bias system which consists of the two small leaf springs 552. The springs 552 are bent approximately into a V-shape. The catch 544 engages, by means of a projection 554, the wall of a complementary shaped aperture 556 in the housing side wall 558. The catch 544, as may be seen from FIG. 20, is provided with wedge-like projections and is unlocked in the same manner as described above in the discussion of the embodiment of FIGS. 17–19.

In the embodiment of FIGS. 23–26 the transport slider 574 is supported within a housing 570 for sliding movement on guide rails 572. The tongue of a leaf spring 576, which has an integral downwardly extending locking projection 578, is formed from the floor of transport slider 574. The forwardly disposed end of the leaf spring 576 is provided with a inwardly and downwardly beveled surface 580. The surface 580 cooperates with a complementary wedge-shaped projection 582 of a release button 584. The release button 584 is mounted within a double-walled frontal region, indicated at 586, of the transport slider 574. During assembly the release button may be inserted from the bottom by resilient deformation of the front wall of the transport slider and deflection of the leaf spring.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In apparatus for storing recording media, the apparatus comprising housing means having a first side with at least a first opening therein, the housing first side defining the front of the apparatus, the apparatus also comprising at least a first transport slider means guided for movement in and relative to the housing means through the first side opening thereof, the slider means being arranged to receive a recording medium, the transport slider means being movable between a storage position within the housing means and an outer removal position in which a recording medium placed in the transport slider means can easily be grasped, the apparatus also comprising an ejection spring arrangement which biases the transport slider means into the outer removal position, the apparatus additionally comprising means for automatically locking the transport slider means to the housing means in the storage position of the transport slider means when the transport slider means is pushed inwardly from its removal position, an improved locking mechanism comprising, catch means for rigidly coupling the slider means to the housing means in the storage position of the slider means, said catch means including a catch element carried by one of the slider and housing means, said catch element being at least in part displaceable relative to the other of said means to selectively lock and unlock the slider means whereby the slider means can move to the removal position under the influence of the ejection spring when unlocked, said catch element being supported against movement relative to said slider means in the direction of the movement of said slider means;

release means for actuating said catch element to cause the unlocking thereof, said release means including a release element which is linearly displaceable generally in the direction of insertion of the transport slider means, said release element extending from the front of the apparatus and being constructed and located to contact said catch element and impart movement to said at least part of said catch element in a direction generally transverse to the direction of movement of the transport slider means to decouple the transport slider means from the housing means; and means for resiliently biasing said release element away from said catch element.

2. The apparatus of claim 1 wherein the movement of the release element is limited by stops and is greater than that required to unlock said catch element.

3. The apparatus of claim 1 wherein the catch element and the release element are both mounted on the transport slider means.

4. The apparatus of claim 1 further comprising at least a second release element for imparting movement to said catch element.

5. The apparatus of claim 1 further comprising means for resiliently biasing said catch element into the locked position.

6. The apparatus of claim 5 wherein the means for resiliently biasing said catch element also provides the resilient bias for said release element.

7. The apparatus of claim 1 wherein the mass of said release element and the resilient bias force applied to said release element are such that decoupling due to inertia forces can occur only at a predetermined acceleration of the apparatus in the direction in which the transport slider means travels in moving from the storage to the removal position.

8. The apparatus of claim 1 wherein the recording media are disc-shaped and wherein the apparatus includes a plurality of transport slider means, each transport slider means having a front wall defining portion which is articulated to a main recording medium support member about an axis which extends transversely to the direction of movement of the transport slider means, the opposite faces of a recording medium supported on said support member being accessible when said transport slider means are in the removal position.

9. The apparatus of claim 8 wherein each disc-shaped recording medium is provided with its own transport slider means and said slider means in the removal position extend from the housing means to a point where a portion of the main support member which is sufficient to act as an insertion guide member projects out of the housing means.

10. The apparatus of claim 9 wherein recording medium braking means are provided on said main support members, said braking means contacting the edge of an inserted recording medium in the region of that half thereof which faces towards the front wall defining portion, said braking elements being arranged at a distance from each other which is smaller than the diameter of the recording medium, and being capable of being resiliently deflected away from each other in such a way that when a recording medium is pushed therebetween the braking elements yield until they are at a distance from each other equal to the recording medium diameter.

11. The apparatus of claim 8 wherein the housing means has a rear wall and wherein the bias spring arrangement for each transport slider means comprises a helical torsion spring, of which the helix and one projecting end of each spring being housed in the main support member while the other projecting spring end is free and engages an associated groove in the rear wall of the housing means, said torsion spring other projecting end lying in a plane defined by said support member.

12. The apparatus of claim 8 further comprising indicating means for showing whether the transport slider means is empty or occupied, the indicating means comprising a pivotable feeler which, when said front wall defining portion is pivoted into the insertion position, is spring biased against the surface of an inserted recording medium, said indicating means further comprising an indicating element which is coupled to said feeler, the feeler and the indicating element being constructed as arms of a two-armed lever which is rotatably supported in said front wall defining portion.

13. The apparatus of claim 12 wherein said front wall defining portions are each biased by means of a leaf spring arranged in the region of said axis into a position in which said front wall defining portions are pivoted away from the main support member, and wherein the leaf springs each have an extension which provides the spring bias for said pivotable feelers.

14. The apparatus of claim 10 wherein the braking elements are integral with the main support members.

15. The apparatus of claim 10 wherein the angle defined by an apex in the center point of an inserted disc-shaped recording medium and lines passing through the points of contact of the braking elements with the edge of the recording medium is less than 160° and greater than 90°.

16. The apparatus of claim 15 wherein said angle is approximately 140°.

17. The apparatus of claim 1 wherein said catch element is integral with the said one of the housing and transport slider means and is at least in part resiliently displaceable relative thereto.

18. The apparatus of claim 1 wherein one of the elements is integral with one of the means and the connection therebetween is constructed as a bias spring for the element.

19. The apparatus of claim 18 wherein the other element is separate from the other means and is inserted therein.

20. The apparatus of claim 1 wherein the catch element is displaceable parallel to a plane defined by a recording medium support surface of the transport slider means.

21. The apparatus of claim 1 wherein the catch element is displaceable in a direction transverse a plane defined by a recording medium support surface of the transport slider means.

22. The apparatus of claim 21 wherein the catch element cooperates with an aperture in the transport slider means.

23. The apparatus of claim 20 wherein the catch element cooperates with an aperture in the transport slider means.

24. The apparatus of claim 21 wherein the housing means includes side walls and wherein said transport slider means is guided along rails molded on the side walls of the housing means and wherein the catch element cooperates with a latch portion of a guide rail.

25. The apparatus of claim 24 wherein the guide rails engage guide slots provided on the transport slider means and wherein the catch element is constructed as a cut-out tongue-shaped section of a web bordering a guide slot.

26. In apparatus for storing recording media, the apparatus comprising housing means having a first side with at least a first opening therein, the housing first side defining the front of the apparatus, the apparatus also comprising at least a first transport slider means guided for movement in and relative to the housing means through the first side opening thereof, the slider means being arranged to receive a recording medium, the transport slider means being movable between a storage position within the housing means and an outer removal position in which a recording medium placed in the transport slider means can easily be grasped, the apparatus also comprising an ejection spring arrangement which biases the transport slider means into the outer removal position, the apparatus additionally comprising means for automatically locking the transport slider means to the housing means in the storage position of the transport slider means when the transport slider means is pushed inwardly from its removal position, an improved locking mechanism comprising,
   catch means for rigidly coupling the slider means to the housing means in the storage position of the slider means, said catch means including a catch element carried by one of the slider and housing means, said catch element being at least in part displaceable relative to the other of said means to selectively lock and unlock the slider means whereby the slider means can move to the removal position under the influence of the ejection spring when unlocked, said catch element being supported against movement relative to said slider means in the direction of the movement of said slider means;
   release means for actuating said catch element to cause the unlocking thereof, said release means including a release element which is integral with the transport slider means and is linearly displaceable generally in the direction of insertion of the transport slider means, said release element extending from the front of the apparatus and being constructed and located to contact said catch element and impart movement to said at least part of said catch element in a direction generally transverse to the direction of movement of the transport slider means to decouple the transport slider means from the housing means; and
   means for resiliently biasing said release element away from said catch element, said biasing means comprising a first resilient intermediate member which connects said release element to the transport slider means.

27. In apparatus for storing recording media, the apparatus comprising housing means having a first side with at least a first opening therein, the housing first side defining the front of the apparatus, the apparatus also comprising at least a first transport slider means guided for movement in and relative to the housing means through the first side opening thereof, the slider means being arranged to receive a recording medium, the transport slider means being movable between a storage position within the housing means and an outer removal position in which a recording medium placed in the transport slider means can easily be grasped, the apparatus also comprising an ejection spring arrangement which biases the transport slider means into the outer removal position, the apparatus additionally comprising means for automatically locking the transport slider means to the housing means in the storage position of the transport slider means when the transport slider means is pushed inwardly from its removal position, an improved locking mechanism comprising, catch means for rigidly coupling the slider means to the housing means in the storage position of the slider means, said catch means including a catch element on the housing means, said catch element being at least in part displaceable relative to the transport slider means to selectively lock and unlock the slider means whereby the slider means can move to the removal position under the influence of the ejection spring when unlocked, said catch element being supported against movement relative to said slider means in the direction of the movement of said slider means;

release means for actuating said catch element to cause the unlocking thereof, said release means including a release element which is linearly displaceable generally in the direction of insertion of the transport slider means, said release element being mounted on said housing means and extending from the front of the apparatus, said release element being constructed and located to contact said catch element and impart movement to said at least part of said catch element in a direction generally transverse to the direction of movement of the transport slider means to decouple the transport slider means from the housing means; and means for resiliently biasing said release element away from said catch element.

28. In apparatus for storing recording media, the apparatus comprising housing means having a first side with at least a first opening therein, the housing first side defining the front of the apparatus, the apparatus also comprising at least a first transport slider means guided for movement in and relative to the housing means through the first side opening thereof, the slider means being arranged to receive a recording medium, the transport slider means being movable between a storage position within the housing means and an outer removal position in which a recording medium placed in the transport slider means can easily be grasped, the apparatus also comprising an ejection spring arrangement which biases the transport slider means into the outer removal position, the apparatus additionally comprising means for automatically locking the transport slider means to the housing means in the storage position of the transport slider means when the transport slider means is pushed inwardly from its removal position, an improved locking mechanism comprising, catch means for rigidly coupling the slider means to the housing means in the storage position of the slider means, said catch means including a catch element mounted on the housing means, said catch element being at least in part displaceable relative to the transport slider means to selectively lock and unlock the slider means whereby the slider means can move to the removal position under the influence of the ejection spring when unlocked, said catch element being supported against movement relative to said slider means in the direction of the movement of said slider means;

release means for actuating said catch element to cause the unlocking thereof, said release means including a release element which is linearly displaceable generally in the direction of insertion of the transport slider means, said release element being mounted on the transport slider means and extending from the front of the apparatus, said release element being constructed and located to contact said catch element and impart movement to said at least part of said catch element in a direction generally transverse to the direction of movement of the transport slider means to decouple the transport slider means from the housing means; and means for resiliently biasing said release element away from said catch element.

29. The apparatus of claim 28 further comprising means for resiliently biasing said catch element into the locked position.

30. The apparatus of claim 29 wherein said resilient biasing means each comprise a bias spring.

31. The apparatus of claim 30 wherein said bias springs are comprised of metal.

32. The apparatus of claim 30 wherein at least one of the bias springs is integral with the associated element.

33. The apparatus of claim 28 wherein a common bias spring is associated with said catch and release elements and said elements are mechanically coupled to each other.

34. In apparatus for storing recording media, the apparatus comprising housing means having a first side with at least a first opening therein, the housing first side defining the front of the apparatus, the apparatus also comprising at least a first transport slider means guided for movement in and relative to the housing means through the first side opening thereof, the slider means being arranged to receive a recording medium, the transport slider means being movable between a storage position within the housing means and an outer removal position in which a recording medium placed in the transport slider means can easily be grasped, the apparatus also comprising an ejection spring arrangement which biases the transport slider means into the outer removal position, the apparatus additionally comprising means for automatically locking the transport slider means to the housing means in the storage position of the transport slider means when the transport slider means is pushed inwardly from its removal position, an improved locking mechanism comprising, catch means for rigidly coupling the slider means to the housing means in the storage position of the slider means, said catch means including a catch element carried by one of the slider and housing means, said catch element being at least in part displaceable relative to the other of said means to selectively lock and unlock the slider means whereby the slider means can move to the removal position under the influence of the ejection spring when unlocked, said catch element being supported against movement relative to said slider means in the direction of the movement of said slider means;

release means for actuating said catch element to cause the unlocking thereof, said release means including a release element which is linearly displaceable generally in the direction of insertion of the transport slider means, said release element extending from the front of the apparatus and being constructed and located to contact said catch element and impart movement to said at least part of said catch element in a direction generally transverse to the direction of movement of the transport slider means to decouple the transport slider means from the housing means, said release element being coupled to said catch element by means of a wedge-shaped actuating surface.

means for resiliently biasing said release element away from said catch element.

35. In apparatus for storing recording media, the apparatus comprising housing means having a first side with at least a first opening therein, the housing first side defining the front of the apparatus, the housing means also having an apertured floor panel, apparatus also comprising at least a first transport slider means guided for movement in and relative to the housing means through the first side opening thereof, the slider means being arranged to receive a recording medium, the transport slider means being movable between a storage position within the housing means and an outer removal position in which a recording medium placed in the transport slider means can easily be grasped, the apparatus also comprising an ejection spring arrangement which biases the transport slider means into the outer removal position, the apparatus additionally comprising means for automatically locking the transport slider means to the housing means in the storage position of the transport slider means when the transport slider means is pushed inwardly from its removal position, an improved locking mechanism comprising, catch means for rigidly coupling the slider means to the housing means in the storage position of the slider means, said catch means including a catch element carried by the slider means, said catch element cooperating with an aperture in the housing means floor panel and being at least in part displaceable relative to the said floor to selectively lock and unlock the slider means whereby the slider means can move to the removal position under the influence of the ejection spring when unlocked, said catch element being supported against movement relative to said slider means in the direction of the movement of said slider means;

release means for actating said catch element to cause the unlocking thereof, said release means including a release element which is linearly displaceable generally in the direction of insertion of the transport slider means, said release element extending from the front of the apparatus and being constructed and located to contact said catch element and impart movement to said at least part of said catch element in a direction generally transverse to the direction of movement of the transport slider means to move said catch element out of the aperture in the housing means floor to thereby decouple the transport slider means from the housing means; and means for resiliently biasing said release element away from said catch element.

36. In apparatus for storing recording media, the apparatus comprising housing means having a first side with at least a first opening therein, the housing first side defining the front of the apparatus, the apparatus also comprising a plurality of transport slider means guided for movement in and relative to the housing means through the first side opening thereof, the slider means each being configured to receive a recording medium, the transport slider means being movable between a storage position within the housing means and an outer removal position in which a recording medium placed in the transport slider means can easily be grasped, the apparatus also comprising an ejection spring arrangement which biases the transport slider means into the outer removal position, the apparatus additionally comprising means for automatically locking each of the transport slider means to the housing means in the storage position of the transport slider means when each transport slider means is pushed inwardly from its removal position, an improved locking mechanism comprising, catch means for rigidly coupling each of the slider means to the housing means in the storage position of the slider means, said catch means each including a catch element carried by one of the slider and housing means, said catch elements being at least in part displaceable relative to the other of said means to selectively lock and unlock the slider means whereby the slider means can move to the removal position under the influence of the ejection spring arrangement when unlocked, said catch element being supported against movement relative to said slider means in the direction of the movement of said slider means;

release means for actuating said catch elements to cause the unlocking thereof, said release means each including a release element which is linearly displaceable generally in the direction of insertion of the transport slider means, said release element extending from the front of the apparatus and being constructed and located to contact said catch elements and impart movement to said at least part of said catch elements in a direction generally transverse to the direction of movement of the transport slider means to decouple the transport slider means from the housing means, said release elements being staggered with respect to one another; and means for resiliently biasing said release elements away from said catch elements.

37. The apparatus of claim 36 wherein the housing means includes a pair of parallel opposite side walls and said release elements are arranged alternately adjacent the opposite side walls of the housing means.

* * * * *